United States Patent Office 3,812,067
Patented May 21, 1974

3,812,067
STOVING LACQUERS
Themistoklis Katsimbas, Hamburg, Horst Dalibor, Harksheide, and Peter Quednau, Hamburg, Germany, assignors to Reichhold-Albert-Chemie Aktiengesellschaft, Hamburg, Germany
No Drawing. Continuation-in-part of abandoned application Ser. No. 229,183, Feb. 24, 1972. This application Apr. 12, 1973, Ser. No. 350,396
Claims priority, application Switzerland, Feb. 26, 1971, 2,866/71; Jan. 25, 1972, 1,057/72
Int. Cl. C08f 15/40
U.S. Cl. 260—28.5 R            15 Claims

ABSTRACT OF THE DISCLOSURE

The present invention relates to stoving lacquers for the coil coating procedure comprising organic solvents and film-forming copolymers of styrene, acrylic acid or methacrylic acid, N-alkoxyalkylacrylic acid amides or N-alkoxyalkylmethacrylic acid amides, hydroxyalkylacrylate or hydroxyalkyl methacrylates, ethylacrylate and methylmethacrylate, the copolymers of which are still soluble in organic solvents and have been produced in a two-step method. These stoving lacquers are used for lacquering rolled tinplate for strips of tin-plate which can be coiled up and shaped and punched by the processor, with the lacquering remaining undamaged even on stretched and punched surfaces (coil coating process).

CROSS-REFERENCE TO RELATED APPLICATION

This is a continuation-in-part application of application Ser. No. 229,183, filed Feb. 24, 1972 in the U.S. Patent Office, now abandoned. Applicants claim priority of applications Ser. Nos. 2,866/71 and 1,057/72, filed Feb. 26, 1971 and Jan. 25, 1971, respectively, in the Swiss Patent Office.

BACKGROUND OF THE INVENTION

(1) Field of the invention

The stoving lacquers of this invention are especially distinguished in that they have an improved pigment binding capacity and that the lacquerings manufactured with them develop their valuable properties practically completely already at relatively short stoving times (for examples 1 to 3 minutes) at 260° C. Furthermore, lacquers manufactured from each copolymers yield lacquerings of improved adhesion and impact strength having particularly pronounced elasticity and hardness. Lacquerings are obtained which also possess other properties, such as light resistance, flexural strength, and solvent resistance to an exceptional degree. Since the valuable properties of the lacquerings manifest themselves especially on metals such as iron, aluminum, magnesium and alloys of these metals, the stoving lacquers are above all suitable for lacquering articles made of sheet metal, for example parts of coachwork, boats and refrigerators and also cans, jugs, buckets and for industrial and domestic appliances. The stoving lacquers can be used equally well for the production of primer coats and of top coats. Because of their adhesion, they are furthermore very suitable for the manufacture of one-coat lacquerings on metal, and the high surface gloss in general makes subsequent polishing superfluous.

(2) Prior art

German Published Specification 1,102,410 discloses stoving lacquers which contain
(I) Organic solvents and
(II) Copolymers of
(A) esters of acrylic or methacrylic acid with alkanols,
(B) ethers of N-methylolacrylic acid amide or N-methylolmethacrylic acid amide with alkanols or phenylalcohols,
(C) monoesters of acrylic or methacrylic acid with polyhyldric hydroxy compounds and optionally additionally
(D) other compounds possessing an ethylenically unsaturated copolymerizable group, such as acrylonitrile, acrylic and methacrylic acid, higher esters of ethylenecarboxylic acids, styrene and vinyl acetate.

such stoving lacquers are distinguished by a series of valuable properties, however, they do not approach the lacquers of the present invention, as has been shown by Comparison Test 3. The cured coatings of the present invention show superior pendulum hardness and combined cross-cut and deep drawing values. Also no yellowing of the coatings can be observed.

U.S. Pat. 3,453,345 to Mabrey et al. claim a heat hardenable linear addition copolymer comprising an interpolymerization reaction product of a number of copolymerable monomers well-known. The Mabrey et al. patent discloses monomers, which are employed also by the present invention. There is, however, a very serious difference concerning the method of cross-linking the copolymer with the aid of the alkylol acrylamide residues in the linear polymer chains. Mabrey et al. form the alkylol acrylamide component in situ while copolymerizing all monomers. By this method a reproducible building in of the alkylol acrylamide and parallel thereto a reproducible structure of the polymer chain cannot be secured. Since the properties of a copolymer always depend mainly upon the sequence of the polymer chain, this becomes a very important factor. It has been discovered that improved stovable coating compositions are obtained when the polymerization mixture of the indicated monomesr contains the component (a), the ether of the N-methylolmethacrylamide with the $C_1$ to $C_8$-alkanol present, per se in the mixture, in combination with the other ingredients.

That is, it has been discovered that, surprisingly superior physical properties in the coatings are obtained if the component (a) is prepared ahead of time, prior to reaction with the other monomers.

The advantages of this discovery are supported by Comparison Test 2 to of the present specication. In Test 2 the preparation and comparison of the stovable polymer coating composition is described in accordance with Example 4, compared to the composition of Example 3 of the Mabrey et al. patent. In the present invention the N-methylolacrylamide ether component (a) was preformed. In the Mabrey et al. Example 3, the N-methylolacrylamide ether had to have been prepared in situ by his use of acrylamide and 40 percent formaldehyde dissolved in butanol. The differences in results between the coatings of the present invention and the coatings of Mabrey et al. and the Rohm and Haas patents are shown in Comparison Tests. The Table shows that the coatings prepared according to Rohm and Haas and Mabrey do not have a completely cured and non-tacky surface. Yellowing of the Rohm and Haas and Mabrey coatings has also been observed. The most surprising difference between the coatings of applicants and those of the Rohm and Haas and Mabrey manifests itself in a comparison of the pendulum hardness and the combined cross-cut and deep drawing values. Applicants' lacquer compositions give excellent pendulum hardness and other desirable properties when applied as a coating and baked for only 3 minutes. The prior art lacquer compositions did not give nearly as good coating properties, even when baked for 30 minutes as required by Mabrey, a period which is not practical on an industrial scale, and even under the longer baking time the prior art lacquer compositions were tacky and yellow.

SUMMARY

Stoving lacquers for the coil coatings procedure comprising organic solvents and film-forming copolymers of styrene, acrylic acid or methacrylic acid, N-alkoxyalkylacrylic acid amides or N-alkoxyalkylmethacrylic acid amides, hydroxyalkylacrylate or hydroxyalkyl methacrylates, ethylacrylate and methylmethacrylate, the copolymers of which are still soluble in organic solvents and have been produced in a two-step method wherein (1) an ether of N-methylolacrylamide or N-methylolmethacrylamide is made by warming 1 mol of acrylamide of methacrylamide, 1 to 1.5 mols of paraformaldehyde, 1 to 3 mols of a saturated alcohol of 1 to 8 carbon atoms and maleic anhydride as the catalyst, and (2) a mixture of
 (a) 4 to 11% by weight of this ether of N-methylolacrylamide or N-methylolmethacrylamide,
 (b) 10 to 30% by weight of styrene,
 (c) 1 to 3% by weight of acrylic acid or methylacrylic acid,
 (d) 55 to 65% by weight of ethylacrylate,
 (e) 5 to 20% by weight of methylmethacrylate and
 (f) 2 to 10% by weight of hydroxyalkyl esters of methacrylic acid or acrylic acid, of the following formula

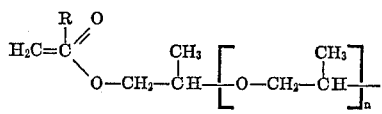

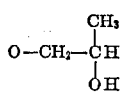     (I)

wherein $n$ represents numbers between 2 and 6,
R is hydrogen or a methyl group and the compound of the formula (I) or its mixtures possess hydroxyl numbers of about 100 to about 200, and the sum of the percentages of components (a) to (f) is in each case 100, was poured over a period of about one to four hours into a solvent mixture heated to 80–125° C. and consisting of a mixture of aromatic solvents of boiling point 180° C. to 270° C. and butyldiglycol or ethyldiglycol, the ratio of aromatics to glycol-ethers being between 1:1 and 2:1 parts by weight, under an inert gas, and the polymerization was then continued for approximately 2 to 8 hours in order to achieve as complete a conversion of the monomers as possible. A specially preferred embodiment of the invention concerns stoving lacquers wherein in step (2) the following mixture has been employed:

(a) 6 to 9% by weight of an ether of N-methylolacrylamide or N-methylolmethacrylamide with n-butanol,
(b) 10 to 20% by weight of styrene,
(c) 1 to 3% by weight of acrylic acid or methylacrylic acid,
(d) 55 to 65% by weight of ethyl acrylate,
(e) 5 to 20% by weight of methyl methacrylate and
(f) 4 to 8% by weight of hydroxyalkyl esters of methacrylic acid, of the formula (I) already mentioned.

The most preferred embodiment is presented by a stoving lacquer wherein in step (2) the following mixture has been employed:

(a) 5.8% by weight of the ether of N-methylolmethacrylamide with n-butanol,
(b) 10.2% by weight of styrene,
(c) 2.8% by weight of acrylic acid,
(d) 61.9% by weight of ethylacrylate,
(e) 17.1% by weight of methyl methacrylate and
(f) 2.2% by weight of hydroxyalkylester of methacrylic acid of the formula (I) wherein $n$ is 4.

For the most preferred embodiment the above mentioned mixture of (a), (c), (d), (e), and (f) has to be poured continuously into a solvent mixture consisting of 60% by weight of a mixture A of about 80% by weight of aromatic hydrocarbons and about 20% by weight of aliphatic hydrocarbons having a boiling point of between 208° and 254° C. and B of 40% by weight of diethyleneglycolmonobutylether. The preferred admission temperature is between 90 and 100° C. The admission time of 2±0.5 hours of the monomer mixture into the solvent mixture, which is heated to 90 to 100° C. is preferred.

Tert.-butylperoctoate is the especially preferred polymerization initiator. The copolymerization is being controlled in the most preferred embodiment of the stoving lacquer by regulating the admission speed of the monomer mixture, the reaction temperature and the admission of the polymerization initiator, so that the obtained copolymer has a viscosity of about $Z_2$ according to Gardner-Holdt, measured in a 51% strength by weight solvent mixture (consisting of A and B) at 20° C.

The most preferred embodiment of the stoving lacquers is being described by Example 2.

A special further embodiment of the stoving lacquers is characterized in that the copolymer contains a copolymerized ether of N-methylolmethacrylamide with isobutanol or, preferably n-butanol, which contains, in its solution, the catalyst or its esterification products, maleic anhydride having been employed as the catalyst.

As component (a), ethers of N-methylolacrylamide or N-methylolmethacrylamide with saturated alcohols having 1 to 8 carbon atoms, such as methanol, ethanol, propanol, n-butanol, isobutanol, pentanol, hexanol, heptanol, octanol or 2-ethylhexanol are contained.

Ethers of N-methylolacrylamide or N-methylolmethacrylamide with n-butanol are preferentially incorporated in the copolymer.

The particularly preferentially incorporated ether of N-methylolmethacrylamide with n-butanol or isobutanol is obtained by a particularly suitable reaction of the reactants in the ratio of 1 mol of methaccrylamide, 1 to 1.5 mols of paraformaldehyde, 1 to 3 mols of n-butanol and maleic anhydride with warming and while largely removing water. A reaction product wherein the ratios of the reactants are 1 mol of methacrylamide, 1.2 mols of paraformaldehyde and 2 mols of n-butanol and 0.01 to 0.03 mol of maleic anhydride is the most suitable for incorporation into the copolymer. The reaction mixture of methacrylamide, paraformaldehyde, n-butanol and maleic anhydride which is employed yields, after reaction, approx. 65% by weight ±3% by weight of the ether of N-methylolmethacrylamide with n-butanol and approx. 35% by weight ±3% by weight of n-butanol, while in the reaction of methacrylamide, paraformaldehyde, isobutanol and maleic anhydride a product of approx. 64% by weight ±3% by weight of the ether of N-methylolmethacrylamide with isobutanol and approx. 36% by weight ±3% by weight of isobutanol is obtained.

The most preferred embodiment of the stoving lacquers consists of employing, as the ether of N-methylolmethacrylamide with n-butanol, the reaction mixture solution obtained by reaction of 4 mols of methacrylamide, 4.67 mols of paraformaldehyde, 8 mols of n-butanol and 0.03 mol of maleic anhydride while removing water. Such a reaction batch contains approximately:

64.0% by weight of the ether of N-methylolmethacrylamide with n-butanol,
32.5% by weight of butanol,
0.8% by weight of paraformaldehyde,
1.6% by weight of water,
0.6% by weight of methacrylamide and
0.5% by weight of maleic acid monobutyl ester.

A further copolymer which also leads to a usable embodiment of the stoving lacquers is obtained if, as the ether of N-methylolmethacrylamide with isobutanol, the reaction mixture solution obtained by reacting 4 mols of methacrylamide, 4.67 mols of paraformaldehyde, 8.0 mols of isobutanol and 0.03 mol of maleic anhydride, while removing water, is employed for the copolymerization.

Such a reaction mix contains approximately:

63.4% by weight of the ether of N-methylolmethacrylamide with isobutanol,
33.0% by weight of isobutanol,
0.8% by weight of paraformaldehyde,
1.5% by weight of water,
0.8% by weight of methacrylamide and
0.5% by weight of maleic acid monoisobutyl ester.

If the ether of N-methylolmethacrylamide with isobutanol is employed with the monomeric compounds mentioned under (b) to (f), products are obtained which after stoving give hard surface lacquering. If, however, a product is desired which is to show more elastic properties after the stoving process, a copolymer with the ether of N-methylolmethacrylamide with n-butanol and the monomeric compounds mentioned under (b) to (f) is manufactured.

Ethyl acrylate is employed as the component (d).
Methyl methacrylate is employed as the component (e).
Hydroxyalkyl esters of methacrylic acid or acrylic acid, the esterification products of methacrylic acid or acrylic acid and polypropylene glycol of the formula:

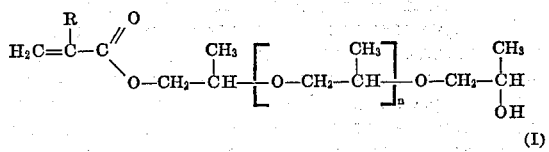

(I)

wherein $n$ represents numbers between 2 and 6, R is hydrogen or a methyl group and the compound of the formula (I) or its mixtures possess hydroxyl numbers of about 100 to about 200 (the sum of the percentages of the compounds designated (a) to (f) in each case being 100) are employed as the component (f).

The polypropylene glycol radicals contained in the component (f) have a molecular weight of about 200 to about 500. These hydroxyalkyl esters of methacrylic acid or acrylic acid possess hydroxyl numbers of about 100 to about 200. The particularly preferred hydroxyalkyl esters of acrylic or methacrylic acid have hydroxyl numbers of about 130 to about 150.

Suitable solvents for the copolymers used according to the invention are the customary alkylbenzenes, such as toluene, xylene or mesitylene, or alkylnaphthalenes with boiling points of about 180° C. to 270° C., alcohols, such as n- and i-butanols, monoethers of diols, such as ethanediol monomethyl ether, and diethylene glycol monobutyl ether, esters of alkanols, such as ethyl acetate, and monoethermonoesters of diols, such as ethanediol monomethyl ethermonoacetate as well as mixtures of such substances with one another or with the addition of hydrocarbons with boiling points of about 180° C. to 280° C.

The copolymers can be manufactured in the usual manner, in general appropriately by solution polymerization in such solvents as are also to be constituents of the finished stoving lacquers. The polymerization can appropriately be initiated by the customary initiators or initiator systems of initiators and activators.

Suitable polymerization initiators for the manufacture of the copolymers used according to the invention are all compounds which form free radicals under the reaction conditions. Peroxy compounds and azonitriles are preferred. Examples of suitable peroxy compounds are dibenzoyl peroxide, di-tert.-butyl peroxide, dioctadecyl peroxide, t-butyl peroxypivalate, disuccinoyl peroxide, urea peroxide, peracetic acid and perbenzoic acid, alkyl-dialkyl boronperoxides and alkali persulphates, perborates and percarbonates, in each case by themselves or in combination with a reducing agent. Suitable azonitriles are, for example, 1,1-azodicyclohexanecarbonitrile,
α,α'-azobis-(isobutyronitrile),
α,α'-azobis-(α,γ-dimethylvaleronitrile),
α,α'-azobis-(α-methyleneanthronitrile),
α,α'-azobis-(α-phenylpropionitrile),
α,α'-azobis-(α-cyclohexylpropionitrile),
α,α'-azobis-(α-methyl-γ-carboxybutyronitrile),
disodium γ,γ'-azobis-(γ-cyanovalerate) and
1,1'-azodicamphanecarbonitrile.

Tert.-butylperoctoate being the most preferred polymerization initiator, because no further regulator is required.

The degree of polymerization and hence the viscosity of the copolymers is adjusted to the desired level by the conjoint use of customary regulators, such as mercaptans and aldehydes. As chain-regulating mercaptans, if any, butylmercaptan, octylmercaptan, laurylmercaptan and tert.-dodecylmercaptan are preferentially employed.

A preferred process for the manufacture of the new copolymers used consists of allowing the monomer mixture, including the polymerization catalysts and optionally chain regulators, separately or as a mixture, to run uniformly, over a period of about one to four hours, into the solvent mixture heated to 80°-125° C., the mixture consisting of aromatic solvents of boiling point 180° C. to 270° C. and butyldiglycol or ethyldiglycol, the ratio of aromatics to glycol-ethers being allowed to be between 1:1 and 2:1 parts by weight, under an inert gas, preferably nitrogen; in this process, the polymerization temperatures should be between 80° C. and about 125° C. The polymerization is then continued for approximately 2 to 8 hours longer in order to achieve as complete a conversion of the monomers as possible. In order reliably to exclude gel formation during the polymerization, the polymerization temperature should not even briefly exceed 130° C. in the case of the abovementioned solvent mixtures, but should instead as far as possible remain within the indicated temperature range.

In the preferred embodiment of the process for the manufacture of the copolymers used the polymerization initiators or catalysts are employed in amounts of 0.8 to 1.5% by weight, relative to the weight of the monomer mixture, di-tertiary butyl peroxide or better tert.-butylperoctoate being most appropriately employed. In the preferred embodiment of the manufacture of the copolymers, the chain regulators, if any, are employed in amounts of 0.1 to 1.5% by weight, relative to the weight of the monomer mixture, tertiary dodecylmercaptan being most appropriately employed.

The improvements in the copolymers, and in the stoving lacquers which can be manufactured therewith, which are achieved by a quantitative and also a special qualitative selection of the monomeric components (a) to (f) were surprising and unforeseeable, particularly since it had to be expected that as a result of the low proportion of the component (a), thermoplastic properties of the copolymers would largely have resulted after stoving. It was all the more surprising that when using the copolymers manufactured from the components (a) to (f) stoving lacquers were obtained which after stoving show a sufficient degree of crosslinking which makes it possible to obtain solvent-resistant and extremely elastic lacquerings.

Suitable copolymers are especially those which are dissolved as a 50% strength solution in a solvent mixture based on hydrocarbons (aromatic solvents based on 80% by weight of aromatic hydrocarbons and 20% by weight of aliphatic hydrocarbons, of boiling point 208° C. to 254° C.) and butyldiglycol (weight ratio of hydrocarbons to butyldiglycol, 60.40) and have a viscosity of about $Z_1$ to $Z_3$ according to Gardner-Holdt.

The copolymers used according to the invention are especially distinguished in that they have an improved pigment binding capacity and that the lacquerings manufactured with them develop their valuable properties practically completely already at relatively short stoving times (for example 1 to 3 minutes) at 260° C. Furthermore, lacquers manufactured from such copolymers yield lacquerings of improved adhesion and impact strength and having particularly pronounced elasticity and hardness. Lacquerings are obtained which also possess other properties, such as light resistance, flexural strength and solvent resistance to an exceptional degree.

Bend test values of 0 to 2 are obtained. By a bend test value of 0 there has to be understood: a lacquered deep drawing sheet shows no lacquer cracks after being bent 180°.

By a bend test value of 1 there has to be understood: a lacquered deep drawing sheet shows no lacquer cracks after being bent about 180° around a sheet of equal sheet strength.

By a bend test value of 2 there has to be understood: a lacquered deep drawing sheet shows no lacquer cracks after being bent about 180° around a sheet of twice the sheet strength.

By a bend test value of 3 there has to be understood: a lacquered deep drawing sheet shows no lacquer cracks after being bent about 180° around a sheet of three times the sheet strength.

Films of bend test value 0 have the best elasticity and films of bend test value 3 have a very good elasticity whereas the values 4 and 5 also still represent good elasticity.

From the copolymers used according to the invention it is possible to manufacture stoving lacquers which, if desired, contain the additives which are customary in stoving lacquers, such as pigments, soluble dyestuffs, optical brighteners and agents for promoting levelling and gloss. In particular other customary lacquer binders, such as alkyd resins, aminoplast resins, phenoplast resins, epoxide resins, cellulose derivatives and polymers not identical to the copolymers which are used in this invention can be present, dissolved and/or dispersed in the stoving lacquers in addition to the copolymers. The weight ratio of the copolymers to the additional other lacquer binders should in general preferably be greater than 1 and in particular greater than 2. The addition of the other customary lacquer binders to the copolymers must be so chosen as to type and amount that clear solutions are obtained and that after the stoving process clear films result. Furthermore, it has generally proved desirable that the weight ratio of the solvents to the total binder constituent in the stoving lacquers should be approximately from 0.4 to 3, in particular approximately from 0.6 to 1.5.

For manufacturing the lacquerings, the stoving lacquers based on the new copolymers can be applied to the articles to be lacquered by using the customary methods, for example, by spraying, brushing, pouring, roller-application, flooding, dipping or impregnation. The lacquerings can in general be stoved appropriately at temperatures of approximately 180° to 300° C., especially approximately 240° to 260° C. and for a period of approximately 0.5 to 4 minutes, especially approximately 0.5 to 2 minutes, depending on the temperature. Since the valuable properties of the lacquerings manifest themselves especially on metals such as iron, aluminum magnesium and alloys of these metals, the stoving lacquers are above all suitable for lacquering articles made of sheet metal, for example parts of coachwork, boats and refrigerators and also cans, jugs, buckets and industrial and domestic appliances. The stoving lacquers can be used equally well for the production of primer coats and of top coats; because of their adhesion, they are furthermore very suitable for the manufacture of one-coat lacquerings on metals, and the high surface gloss in general makes subsequent polishing superfluous. If the lacquers are to be stoved at lower temperatures, say 180° C. for 2 to 4 minutes, and/or stoving lacquers are used which contain relatively little copolymerized acrylic or methacrylic acid in the copolymer, it may be advisable to stove the stoving lacquers in the presence of curing agents. Suitable curing agents are the acids or acid-eliminating substances which are customary for curing polymers, for example p-toluenesulphonic acid, maleic acid, phosphoric acid and tartaric acid. The amount of the curing agent should in in general appropriately be about 0.01 to 5, especially about 0.1 to 2, percent by weight of the copolymers.

The stoving lacquers are preferably used as one-coat lacquers, with the said copolymers as the sole binder. If, however, stoving lacquers or multi-coat stoving lacquers of particularly high solvent resistance and outstanding surface hardness and retention of gloss on exposure to the weather are required, the said copolymers are used in combination with aminoplasts.

Preferred aminoplasts are condensation products of formaldehyde and melamine, wherein about 4 to 6 mols of formaldehyde have been reacted per mol of melamine under either weakly acid or weakly basic conditions, and these products should be etherified almost completely, approximately 80 to 100%, with butanol, isobutanol or methanol. The reaction products resulting therefrom should have a molecular weight of about 300 to 1,200 and should be soluble in organic solvents such as xylene and butanol, isobutanol, methanol or glycol-ethers and other alcohols. Formulations for suitable melamine resins are to be found as examples in Swiss Patent Specification 480,380 and in German Published Specification 1,127,083.

The copolymer and the aminoplast resin are dissolved in the organic solvent in the ratio of 85 to 95 parts by weight of the copolymer and 5 to 15 parts by weight of the aminoplast resin. The ratios of the amounts of the copolymers and of the alkylated aminoplast should be so chosen that the two components are compatible both in the coating solution and in the finished film. Any suitable concentration of the copolymer and of the aminoplast in the solvent, for example from 1 to 50% by weight, can be used, given the above proviso. If a pigment is present, the total solids content in the coating composition is between 5 and 75% by weight. The ratio of pigment to binder (copolymer plus aminoplast) can be between 1:20 and 1:2.

Set forth below are several specific examples of the invention. These examples, being illustrative, are not to be construed as limiting. All parts and percentages are by weight unless otherwise specified.

Manufacture of the copolymer solution 1

The following mixture: 52 g. of styrene, 228 g. of ethyl acrylate, 64 g. of methyl methacrylate, 8 g. of acrylic acid, 31 g. of a 65% strength by weight solution of the hydroxy-alkyl ester of methacrylic acid in xylene which is an esterification product of methacrylic acid and polypropylene glycol of hydroxyl number about 130, 43 g. of a 65% strength by weight solution in butanol of the ether of methylolmethacrylamide with n-butanol, present as part of a reaction batch produced from 4 mols of methacrylamide, 4.67 mols of paraformaldehyde, 8 mols of n-butanol and 0.03 mol of maleic anhydride with warming and extensive removal of water. 1.8 g. of dodecylmercaptan and 6 g. of p-tert.-butyl peroxide, is added dropwise uniformly over the course of one hour under a nitrogen atmosphere to a mixture consisting of 178 g. of solvent based on about 80% by weight of aromatic hydrocarbons and about 20% by weight of aliphatic hydrocarbons, or boiling point 208° C. to 254° C., and 178 g. of butyl-diglycol, at 120° C., in a flask equipped with a stirrer, reflux condenser and thermometer. Polymerization is subsequently continued for a further 6 to 8 hours at 125° C. under a nitrogen atmosphere, until the solution has a solids content of 51% by weight and the viscosity is $Z_2$, according to Gardner-Holdt.

EXAMPLE 1

Use of the copolymer 1

196 g. of this copolymer solution 1, 100 g. of titanium dioxide pigment (rutile) and 70 g. of a mixture consisting of equal parts of butyldiglycol and of solvent based on about 80% by weight of aromatic hydrocarbons and about 20% by weight of aliphatic hydrocarbons of boiling point of 208° to 254° C. are homogenized for 48 hours on a ball mill. The lacquer was subsequently applied to Erichsen deep-drawing metal sheets with a lacquer spatula, the solvent was allowed to evaporate and the lacquer was stoved at 260° C. for 90 seconds, 120 seconds and 150 seconds. Glossy, white lacquerings with pendulum hardnesses of 84, 113 and 128 and 157 seconds, according to König, are obtained; furthermore, these lacquerings show an impact deep-draw (reverse impact test) of 80 inch-pound according to Gardner as well as excellent values in the bend test (1 to 2).

Manufacture of copolymer solution 2

The instructions given for the manufacture of copolymer 1 are followed, but instead the following mix is employed: 214 g. solvent mixture of about 80% by weight of aromatic hydrocarbons and about 20% by weight of aliphatic hydrocarbons, having a boiling point of between 208 and 254° C., and 150 g. butyldiglycol. The following monomer mixture consisting of 42 g. styrene, 253 g. ethylacrylate, 70 g. methyl-methacrylate, 12 g. acrylic acid, 37 g. of a 65% strength by weight solution in butanol of the ether of methylolmethacrylamide with n-butanol, present as part of a reaction batch manufactured from 4 mols methacrylamide, 4.67 mols of paraformaldehyde, 8 mols of n-butanol and 0.03 mol maleic anhydride with warming and extensive removal of water, and 14 g. of a 70% strength by weight solution of the hydroxylalkylester of methacrylic acid in xylene, which is an esterification product of methacrylic acid and polypropylene glycol, the esterification product having a hydroxyl number about 130, and 3 g. tert.-butylperoctoate is employed.

The dodecylmercaptane used in the manufacture of copolymer 1 is not hereby employed.

The admission time for the monomer mixture amounts to 2 hours and thereafter the reaction mix is kept at 90° C. for another 5 hours in order to complete the polymerization reaction until the solids content is 51.8% by weight. The obtained solution has a viscosity of $Z_2$ according to Gardner-Holdt at 20° C.

EXAMPLE 2

Use of copolymer 2

As being described in Example 1 a stoving lacquer is manufactured from the copolymer solution 2 by pigmenting with titanium dioxide in the ratio of 1:0.6. The applied coatings are stoved at 260° C. for 1½ to 3 minutes. The coatings then show a bend test value of 0.

The coatings being prepared with the aid of copolymer 2 give highly glossy films having a top hardness of about 110 seconds according to König and a reverse impact test value of 160-inch-pound according to Gardner.

Because of these properties the copolymer 2 is excellently suited as binder for the manufacture of stoving lacquers determined for the coil coating process.

The stoving lacquers of this invention which are prepared using the above described copolymers can be made to have improved top hardness without showing less good bend test values and reverse impact test values according to Gardner by the addition of micronized polyalkylene wax, for example polyethylene, preferably polypropylene, of an average molecular weight of between 1,000 and 10,000, a specific gravity of 0.8 to 0.9, melting point of about 140° C. and a particle size of below 1μ, preferably of below 0.5μ, in amounts of 0.05 to 2% by weight relative to the solids content of the copolymer. This specific embodiment of the invention is shown by the following examples:

EXAMPLE 3

A stoving lacquer is prepared using the copolymer 2 as being described in Example 2, but additionally 1% by weight of polypropylene wax (polypropylene) having a melting point of 140° C. and an average molecular weight of 4,000 to 7,000 is being used as additive in a particle size of 0.5μ.

The weight percentages are related to the solids content of the employed copolymer 2.

EXAMPLE 4

A stoving lacquer is produced using the copolymer 2 as being described in Example 2, but additionally 1% by weight of polypropylene wax (polypropylene) having a melting point of 140° C., an average molecular weight of 4,000 to 7,000 and a particle size of 0.5μ, and 10% by weight of an epoxy resin based on the reaction product of bisphenol A and epichlorohydrin in alkaline medium, having an epoxy equivalent weight of about 400 and a melting point of 60° C.

Stoving lacquers being prepared by Examples 2, 3 and 4 are applied to deep drawing sheets in such a manner that the dried coatings show a film thickness of 25–30μ. These lacquered test sheets were stoved at 260° C. for 90, 120, 150 or 180 seconds. The film thickness after stoving, the pendulum hardness according to König, the visual nail hardness, bend test values, reverse impact strength and the cross-cut with Erichsen deep-drawing value were determined. The results of these test series are presented in the following table:

TECHNICAL TEST VALUES OF COIL-COATING LACQUERS
(Stoving temperature 260° C.)

| | Stoving time in sec. | Film thickness (μ) | Pendulum hardness in sec. | Nail hardness | Bend test | Reverse impact strength, inch pound | Cross-cut and Erichsen deep drawing, 8 mm. |
|---|---|---|---|---|---|---|---|
| Example 2 | 90 | 25–30 | 77 | 5 | 0 | 100 | 0 |
| | 120 | 30 | 97 | 5 | 0 | 160 | 0 |
| | 150 | 30 | 100 | 5 | 0 | 160 | 0 |
| | 180 | 30 | 103 | 5 | 1 | 140 | 0–1 |
| Example 3 | 90 | 25–30 | 78 | 2 | 0 | 140 | 0 |
| | 120 | 30 | 103 | 2 | 0 | 160 | 0 |
| | 150 | 30 | 108 | 1 | 0 | 140 | 0 |
| | 180 | 25–30 | 109 | 1 | 1 | 120 | 0 |
| Example 4 | 90 | 25–30 | 78 | 2 | 0 | 100 | 0 |
| | 120 | 30 | 98 | 1 | 0 | 160 | 0 |
| | 150 | 30 | 107 | 1 | 0 | 120 | 0 |
| | 180 | 30 | 109 | 1 | 1 | 120 | 0 |

COMPARISON TESTS TO SHOW THE ADVANCE OVER THE ART

The resin of Copolymer 2 of the present invention was employed to prove the advance over the art.

Test 1

A self-curable acrylate resin called Luprenal LR 8303 of BASF, Ludwigshafen/Rhein, was employed as comparable commercial product being similar but not identical.

Of both comparable resins white lacquer paints were produced according to the instructions given in Example 1 of this invention and the paint was applied to deep drawing sheets as film using a lacquer spatula. After 15 minutes' air-drying the lacquerings were stoved at 260° C. for 90, 120, 150 and 180 seconds. The thickness of the stoved coatings amounted to 30μ.

The coatings were subjected to the following tests: pendulum hardness according to König, nail hardness, bend test, reverse impact strength in inch pound according to Gardner, cross-cut and Erichsen deep drawing value.

The test results are given in the following table:

TECHNICAL TEST VALUES OF COIL-COATING LACQUERS
(stoving temperature 260° C.)

| | Stoving time in sec. | Film thickness (μ) | Pendulum hardness in sec. | Nail hardness | Bend test | Reverse impact strength, inch pound | Cross-cut and Erichsen deep drawing, 8 mm. |
|---|---|---|---|---|---|---|---|
| Example 2 of the present invention | 90 | 25-30 | 77 | 5 | 0 | 100 | 0 |
| | 120 | 30 | 97 | 5 | 0 | 160 | 0 |
| | 150 | 30 | 100 | 5 | 0 | 160 | 0 |
| | 180 | 30 | 103 | 5 | 1 | 140 | 0-1 |
| Luprenal LR 8303 as comparison resin | 90 | 25-30 | 74 | 5 | 0 | 20 | 0 |
| | 120 | 30 | 88 | 5 | 0 | 20 | 0 |
| | 150 | 30 | 98 | 5 | 0 | 20 | 0 |
| | 180 | 30 | 102 | 5 | 1 | 10 | 0 |

Test 2

A heat hardenable resin composition was prepared according to Example 3, Composition 13, of U.S. Pat. 3,453,345 to Mabrey and coatings were prepared on four deep drawing sheets as described in Test 1, having a film thickness of 26 to 28μ.

Test 3

The instructions given in Example 1 of the German Displayed Specification 1,102,410 (Rohn & Haas) were followed carefully and coatings were prepared just as described in Test 1, having a film thickness of 23μ. The coatings prepared were subjected to several mechanical tests and the obtained testing values are given in the table below.

importance for the coil coating process. A pendulum hardness of about a hundred seconds is absolutely necessary to insure good top hardness, one of the conditions for improved corrosion resistance. So the coatings of the present invention combine excellent elasticity with very good hardness neither of which properties can be obtained by the compared products of Mabrey and of Rohm & Haas because of a low degree of cross linking of their copolymers.

This comparison test shows that the present invention presents lacquers, the stoved films of which have surprisingly excellent reverse impact strength. This property makes it possible to subject the lacquered sheets also to sudden deformation without damaging the lacqurered surface.

It will be obvious to those skilled in the art that other changes and variations can be made in carrying out the present invention without departing from the spirit and scope thereof as defined in the appended claims.

What is claimed is:

1. Stoving lacquers for the coil coating procedure comprising organic solvents and film-forming copolymers of styrene, acrylic acid or methacrylic acid, N-alkoxyalkylacrylic acid amides or N-alkoxyalkylmethacrylic acid amides, hydroxyalkylacrylates or hydroxyalkyl methacrylates, ethylacrylate and methylmethacrylate, the copolymers of which are still soluble in organic solvents and have been produced in a two-step method wherein

TABLE

| | Stoving time in sec. at 260° C. | Pendulum hardness in sec. (König) | Pencil hardness | Bend test | Reverse impact strength, inch pound | Crosscut plus Erichsen deep drawing, 8 mm. | Yellowing visually | Surface |
|---|---|---|---|---|---|---|---|---|
| Example 2 of the present invention. | 90 | 77 | H | 0 | 100 | 0 | 0 | Completely dry. |
| | 120 | 97 | H | 0 | 160 | 0 | 0 | Do. |
| | 150 | 100 | H | 0 | 160 | 0 | 0 | Do. |
| | 180 | 103 | H | 1 | 140 | 0-1 | 0 | Do. |
| Test 2 | 90 | 13 | HB | 0 | 120 | 4 | 2 | Tacky. |
| | 120 | 21 | HB | 2 | 120 | 4 | 2-3 | Slightly tacky. |
| | 150 | 29 | HB | 2 | 120 | 3-4 | 4 | Do. |
| | 180 | 30 | HB | 3 | 120 | 3-4 | 4 | Do. |
| Test 3 | 90 | 8 | 2B | 0 | 160 | 0 | 0 | Strongly tacky. |
| | 120 | 10 | B | 1 | 140 | 3 | 1 | Slightly tacky. |
| | 150 | 14 | B | 1 | 140 | 3-4 | 2 | Do. |
| | 180 | 16 | HB | 1 | 120 | 3 | 2-3 | Do. |

The table shows that the coatings prepared according to Rohm & Haas and Mabrey do not have a completely cured and non-tacky surface. Yellowing of these coatings has also been observed.

The most surprising testing result manifests itself in a comparison of the obtained pendulum hardness and the combined cross-cut and deep drawing value. Although Mabrey uses 73% of the elastic component ethylacrylate and Rohm & Haas even uses 85%, the present invention surprisingly achieves a much better cross cut and Erichsen deep drawing value with improved bend test results also with just the use of 61% of the elastic component. The elastic properties of the obtained coatings in combination with very good pendulum hardness is of tremendous (1) an ether of N-methylolacrylamide or N-methylolmethylacrylamide is made by warming 1 mol of acrylamide or methacrylamide, 1 to 1.5 mols of paraformaldehyde, 1 to 3 mols of a saturated alcohol of 1 to 8 carbon atoms and maleic anhydride as the catalyst, and (2) a mixture of
   (a) 4 to 11% by weight of this pre-formed ether of N-methylolacrylamide or N-methylolmethacrylamide,
   (b) 10 to 30% by weight of styrene,
   (c) 1 to 3% by weight of acrylic acid or methacrylic acid,
   (d) 55 to 65% by weight of ethylacrylate, (e) 5 to 20% by weight of methylmethacrylate and
(f) 2 to 10% by weight of hydroxyalkyl esters of methacrylic acid or acrylic acid, of the following formula

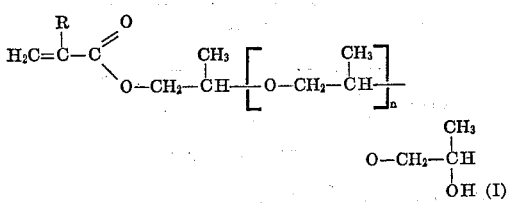

OH (I)

wherein $n$ represents numbers between 2 and 6, R is hydrogen or a methyl group and the compound of the formula (I) or its mixtures possess hydroxyl number of about 100 to about 200, and the sum of the percentages of components (a) to (f) is in each case 100, was poured over a period of about one to four hours, into a solvent mixture heated to 80–125° C. and consisting of a mixture of aromatic solvents of boiling point 180° to 270° C. and butyldiglycol or ethyldiglycol, the ratio of aromatics to glycol-ethers being between 1:1 and 2:1 parts by weight, under an inert gas, and the polymerization was then continued for approximately 2 to 8 hours in order to achieve as complete a conversion of the monomers as possible.

2. Stoving lacquers according to claim 1, wherein in step (1) n- or isobutanol has been employed as the saturated alcohol with 1 to 8 carbon atoms.

3. Stoving lacquer according to claim 1, wherein in step (2) the following mixture has been employed:
(a) 6 to 9% by weight of an ether of N-methylolacrylamide or N-methylolmethacrylamide with n-butanol,
(b) 10 to 20% by weight of styrene,
(c) 1 to 3% by weight of acrylic acid or methacrylic acid,
(d) 55 to 65% by weight of ethyl acrylate,
(e) 5 to 20% by weight of methyl methacrylate and
(f) 4 to 8% by weight of hydroxyalkyl esters of methacrylic acid, of the formula (I) already mentioned.

4. Stoving lacquer according to claim 1 wherein in step (2) the following mixture has been employed:

(a) 5.8% by weight of the ether of N-methylolmethacrylamide with n-butanol,
(b) 10.2% by weight of styrene,
(c) 2.8% by weight of acrylic acid,
(d) 61.9% by weight of ethylacrylate,
(e) 17.1% by weight of methyl methacrylate and
(f) 2.2% by weight of hydroxyalkylester of methacrylic acid of the formula (I) wherein $n$ is 4.

5. Stoving lacquer according to claim 1, wherein micronized polyalkylene wax is contained therein additionally to the copolymer.

6. Stoving lacquer according to claim 5, wherein as polyalkylene wax polyethylene or polypropylene of an average molecular weight of 1,000 to 10,000, a density of 0.8 to 0.9, a melting point of about 140° C. and a particle size of below 1μ is contained.

7. Stoving lacquer according to claim 6, wherein the micronized polyalkylene wax is contained in 0.05 to 2% by weight relative to the solids content of the copolymer.

8. Method for preparing a coating which comprises:
(A) applying to the substrate a stoving lacquer composition comprising organic solvents and film-forming copolymers of styrene, acrylic acid or methacrylic acid, N-alkoxyalkylacrylic acid amides or N-alkoxyalkylmethacrylic acid amides, hydroxyalkylacrylate or hydroxyalkyl methacrylates, ethylacrylate and methylmethacrylate, the copolymers of which are still soluble in organic solvents and have been produced in a two-step method wherein (1) an ether of N-methylolacrylamide or N-methylolmethacrylamide is made by warming 1 mol of acrylamide or methacrylamide, 1 to 1.5 mols of paraformaldehyde, 1 to 3 mols of a saturated alcohol of 1 to 8 carbon atoms and maleic anhydride as the catalyst, and
(2) a mixture of
(a) 4 to 11% by weight of this pre-formed ether of N-methylolacrylamide or N-methylolmethacrylamide, from step (1),
(b) 10 to 30% by weight of styrene,
(c) 1 to 3% by weight of acrylic acid or methacrylic acid,
(d) 55 to 65% by weight of ethylacrylate,
(e) 5 to 20% by weight of methylmethacrylate and
(f) 2 to 10% by weight of hydroxyalkyl esters of methacrylic acid or acrylic acid, of the following formula

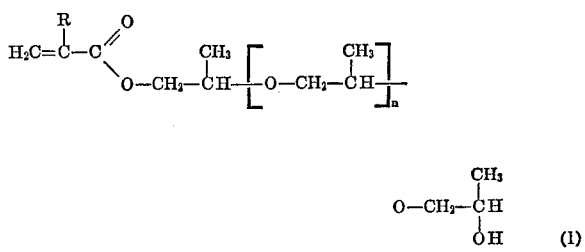

OH (I)

wherein $n$ represents numbers between 2 and 6,
R is hydrogen or a methyl group and the compound of the formula (I) or its mixtures possess hydroxyl numbers of about 100 to about 200, and the sum of the percentages of components (a) to (f) is in each case 100, was poured over a period of about one to four hours, into a solvent mixture heated to 80–125° C. and consisting of a mixture of aromatic solvents of boiling point 180° to 270° C. and butyldiglycol or ethyldiglycol, the ratio of aromatics to glycolethers being between 1:1 and 2:1 parts by weight, under an inert gas, and the polymerization was then continued for approximately 2 to 8 hours in order to achieve as complete a conversion of the monomers as possible, and (B) baking the coated substrate at a temperature of about 180° to about 300° C. for about 0.5 to 4 minutes.

9. Method of claim 8 wherein the substrate is metal.

10. Method according to claim 8 wherein in step (1) n- or isobutanol has been employed as the saturated alcohol with 1 to 8 carbon atoms.

11. Method according to claim 8, wherein in step (2) the following mixture has been employed:
(a) 6 to 9% by weight of a pre-formed ether of N-methylolacrylamide or N-methylolmethacrylamide with N-butanol,
(b) 10 to 20% by weight of styrene,
(c) 1 to 3% by weight of acrylic acid or methacrylic acid,
(d) 55 to 65% by weight of ethyl acrylate,
(e) 5 to 20% by weight of methyl methacrylate and
(f) 4 to 8% by weight of hydroxyalkyl esters of methacrylic acid of the formula (I).

12. Method according to claim 8, wherein in step (2) the following mixture has been employed:
(a) 5.8% by weight of the pre-formed ether of N-methylolmethacrylamide with n-butanol,
(b) 10.2% by weight of styrene,
(c) 2.8% by weight of acrylic acid,
(d) 61.9% by weight of ethylacrylate, (e) 17.1% by weight of methyl methacrylate and
(f) 2.2% by weight of hydroxyalkylester of methacrylic acid of the formula (I) wherein $n$ is 4.

13. Method according to claim 8, wherein micronized polyalkylene wax is contained therein additionally to the copolymer.

14. Method according to claim 13, wherein as polyalkylene wax polyethylene or polypropylene of an average molecular weight of 1,000 to 10,000, a density of 0.8 to 0.9, a melting point of about 140° C. and a particle size of below $1\mu$ is contained.

15. Method according to claim 14 wherein the micronized polyalkylene wax is contained in 0.05 to 2% by weight relative to the solids content of the copolymer.

References Cited

UNITED STATES PATENTS 3,453,345  7/1969  Mabrey _____ 260—80.75

FOREIGN PATENTS 1,102,410  3/1961  Germany.

MORRIS LIEBMAN, Primary Examiner

P. R. MICHL, Assistant Examiner

U.S. Cl. X.R.

260—31.2 N, 33.6 UA, 80.73

UNITED STATES PATENT OFFICE
CERTIFICATE OF CORRECTION

Patent No. 3,812,067      Dated May 21, 1974

Inventor(s) Themistoklis Katsimbas, et al.

It is certified that error appears in the above-identified patent and that said Letters Patent are hereby corrected as shown below:

Column 1, line 37:    "Jan. 25, 1971" should be ---Jan. 25, 1972---.

Column 1, line 46:    "examples" should be ---example,---.

Column 1, line 48:    "each" should be ---such---.

Column 2, line 4:    "polyhyldric" should be ---polyhydric---.

Column 2, line 18:    "copolymerable--- should be ---copolymerizable---.

Column 2, line 34:    "monomesr" should be ---monomers---.

Column 2, line 43:    "specication" should be ---specification---.

Column 3, line 26:    "=" between $H_2C$ and C should be --- - ---.

Column 4, line 40:    "methaccrylamide" should be---methacrylamide-

Column 6, line 72:    "60.40" should be ---60:40---.

Column 11, line 39:    "Rohn" should be ---Rohm---.

Column 12, Claim 1:    "N-methylolmethylacrylamide" should be ---N-methylolmethacrylamide---.

Signed and sealed this 12th day of November 1974.

(SEAL)
Attest:

McCOY M. GIBSON JR.
Attesting Officer

C. MARSHALL DANN
Commissioner of Patents